United States Patent
Mori et al.

(10) Patent No.: US 11,267,970 B2
(45) Date of Patent: Mar. 8, 2022

(54) ASPHALT MODIFIER, ASPHALT COMPOSITION, AND ASPHALT MIXTURE FOR ROAD PAVEMENT

(71) Applicant: SUMITOMO CHEMICAL COMPANY, LIMITED, Tokyo (JP)

(72) Inventors: Susumu Mori, Tokyo (JP); Yusuke Asai, Ichihara (JP); Mitsuhiro Okada, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/616,102

(22) PCT Filed: May 22, 2018

(86) PCT No.: PCT/JP2018/019662
§ 371 (c)(1),
(2) Date: Nov. 22, 2019

(87) PCT Pub. No.: WO2018/221322
PCT Pub. Date: Dec. 6, 2018

(65) Prior Publication Data
US 2020/0157351 A1 May 21, 2020

(30) Foreign Application Priority Data
May 29, 2017 (JP) .............................. JP2017-105798

(51) Int. Cl.
| C08L 95/00 | (2006.01) |
| C08L 23/08 | (2006.01) |
| C08L 29/10 | (2006.01) |
| C08L 33/06 | (2006.01) |

(52) U.S. Cl.
CPC .............. *C08L 95/00* (2013.01); *C08L 23/08* (2013.01); *C08L 29/10* (2013.01); *C08L 33/068* (2013.01); *C08L 2201/08* (2013.01); *C08L 2555/84* (2013.01)

(58) Field of Classification Search
None
See application file for complete search history.

(56) References Cited

U.S. PATENT DOCUMENTS

| 2004/0198874 A1 | 10/2004 | Prejean |
| 2007/0027261 A1 | 2/2007 | Prejean et al. |
| 2008/0153945 A1 | 6/2008 | Prejean et al. |
| 2013/0137802 A1* | 5/2013 | Sawada ................ C08K 5/5317 524/132 |

FOREIGN PATENT DOCUMENTS

| CN | 1798812 A | 7/2006 | |
| CN | 101155880 A | 4/2008 | |
| CN | 101233194 A | 7/2008 | |
| CN | 103108914 A | 5/2013 | |
| EP | 0 837 105 A1 | 4/1998 | |
| EP | 0 837 106 A1 | 4/1998 | |
| EP | 0837105 A1 * | 4/1998 | .............. C08L 95/00 |
| JP | 10-120839 A | 5/1998 | |
| JP | 10-120843 A | 5/1998 | |
| JP | 2001-131348 A | 5/2001 | |
| JP | 2002-356618 A | 12/2002 | |
| JP | 2004-035839 A | 2/2004 | |
| JP | 2017-066238 A | 4/2017 | |
| WO | 2006/080123 A1 | 8/2006 | |
| WO | 2017/015104 A1 | 1/2017 | |
| WO | WO-2017015104 A1 * | 1/2017 | .............. C08L 95/00 |
| WO | 2017/027225 A1 | 2/2017 | |
| WO | 2017/116831 A1 | 7/2017 | |

OTHER PUBLICATIONS

International Search Report issued in corresponding International Patent Application No. PCT/JP2018/019662, dated Aug. 7, 2018, with English translation.
Translation of the International Preliminary Report on Patentability, dated Dec. 12, 2019 and the Written Opinion of the Searching Authority dated Aug. 7, 2018 issued on the International Patent Application No. PCT/JP2018/019662.
Extended European Search Report issued in corresponding European Patent Application No. 18810075.4-1102, dated Oct. 28, 2020.
Chinese Office Action issued in corresponding Chinese Patent Application No. 201880035310.3, dated Mar. 12, 2021, with English translation.
Wu Dongyun et al., "Civil Engineering Materials", Wuhan University of Technology Press, Aug. 2014.
Chinese Office Action issued in corresponding Chinese Patent Application No. 201880035310.3, dated Jul. 14, 2021, with English translation.
European Office Action issued in corresponding European Patent Application No. 18810075.4-1102, dated Oct. 19, 2021.
Chinese Office Action issued in corresponding Chinese Patent Application No. 201880035310.3, dated Oct. 11, 2021, with English translation.
Japanese Notice of Reasons for Rejection issued in corresponding Japanese Patent Application No. 2019-522144, dated Dec. 14, 2021, with English translation.

* cited by examiner

*Primary Examiner* — Christopher M Rodd
(74) *Attorney, Agent, or Firm* — McDermott Will & Emery LLP

(57) ABSTRACT

An asphalt modifier comprising a polyolefin-based copolymer comprising an ethylene-derived monomer unit and a monomer unit having an epoxy group is disclosed. The content of the monomer unit having an epoxy group is 13% by mass or more based on the mass of the polyolefin-based copolymer.

4 Claims, 1 Drawing Sheet

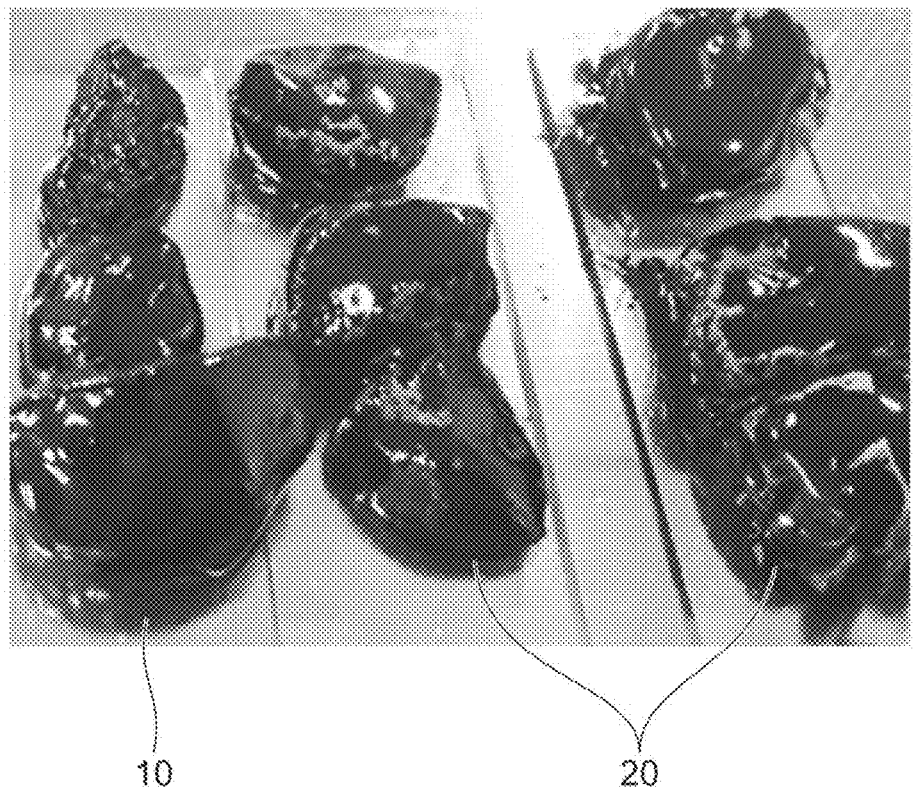

ASPHALT MODIFIER, ASPHALT COMPOSITION, AND ASPHALT MIXTURE FOR ROAD PAVEMENT

CROSS REFERENCE

This application is the U.S. National Phase under 35 U.S.C. § 371 of International Application No. PCT/P2018/019662, filed on May 22, 2018, which claims the benefit of Japanese Application No. 2017-105798, filed on May 29, 2017, the entire contents of each are hereby incorporated by reference.

TECHNICAL FIELD

The present invention relates to an asphalt modifier, an asphalt composition, and an asphalt mixture for road pavement.

BACKGROUND ART

Asphalt is modified with a modifier containing a polyolefin-based resin in some cases in order to improve the heat resistance of asphalt and prevent stripping thereof (for example, Patent Literature 1). In the case of the asphalt compositions used in road pavement, prevention of the stripping of asphalt is important to reduce damage of roads derived from stripping. In addition, it is required that the asphalt composition should have high heat resistance (high softening point), because, in general, road surfaces reach high temperature (for example, 56° C. or more) in some cases.

CITATION LIST

Patent Literature

Patent Literature 1: Japanese Unexamined Patent Publication No. 2004-35839

SUMMARY OF INVENTION

Technical Problem

According to an aspect of the present invention, an object of the present invention is to provide an asphalt composition having favorable heat resistance and exhibiting improved properties in stripping resistance and toughness.

Solution to Problem

An aspect of the present invention relates to an asphalt modifier comprising a polyolefin-based copolymer comprising an ethylene-derived monomer unit and a monomer unit having an epoxy group. The content of the monomer unit having an epoxy group is 13% by mass or more based on the mass of the polyolefin-based copolymer. The present invention also relates to use or application of the polyolefin copolymer for modifying the asphalt composition and use or application of the polyolefin copolymer for producing the asphalt composition.

The asphalt modifier according to the present invention can provide an asphalt composition that has favorable heat resistance and exhibits improved properties in stripping resistance and toughness.

The melt flow rate of the polyolefin-based copolymer may be 300 g/10 min or less. Thereby, the heat resistance of the asphalt composition is further improved.

The asphalt modifier may further comprise a styrene butadiene styrene block copolymer. An asphalt composition exhibiting more excellent properties in heat resistance and stripping resistance can be obtained by a combination of the polyolefin-based copolymer with the styrene butadiene styrene block copolymer.

Another aspect according to the present invention provides an asphalt composition that is a melt kneaded product of a raw material mixture comprising the asphalt modifier described above and an asphalt. This asphalt composition can have favorable heat resistance and can exhibit further improved properties in stripping resistance and toughness.

The content of the polyolefin-based copolymer in the raw material mixture may be 0.01 to 3% by mass based on the mass of the raw material mixture. Even with such a relatively small content, a sufficient modification effect by the modifier can be obtained.

Still another aspect according to the present invention provides an asphalt mixture for road pavement comprising the asphalt composition described above and an aggregate.

Advantageous Effects of Invention

According to the present invention, an asphalt composition and an asphalt mixture having favorable heat resistance and exhibiting further improved properties in stripping resistance and toughness, and a modifier for obtaining these are provided.

BRIEF DESCRIPTION OF DRAWINGS

FIG. 1 is a photograph illustrating an asphalt coated sample after a stripping resistance test.

DESCRIPTION OF EMBODIMENTS

Several embodiments according to the present invention will now be described in detail. It should be noted that the present invention is not limited to the following embodiments.

The asphalt composition according to an embodiment is a melt kneaded product of a raw material mixture comprising an asphalt and an asphalt modifier that comprises a polyolefin-based copolymer comprising an ethylene-derived monomer unit and a monomer unit having an epoxy group.

The asphalt contained in the asphalt composition or the raw material mixture for forming the asphalt composition is not particularly limited, and can be a straight asphalt for pavement, a natural asphalt such as a lake asphalt, a semi-blown asphalt, a blown asphalt-modified straight asphalt, a tar-modified straight asphalt, or a combination thereof.

The polyolefin-based copolymer in the asphalt modifier contains 13% by mass or more of a monomer unit having an epoxy group based on the mass of the polyolefin-based copolymer. If the content of the monomer unit having an epoxy group is larger, the asphalt composition can have sufficient stripping resistance and toughness. From the same viewpoint, the content of the monomer unit having an epoxy group may be 15% by mass or more or 17% by mass or more. If the amount of the epoxy group in the polyolefin-based copolymer is excessively large, the raw material mixture containing the asphalt and the modifier may gelate, so that kneading cannot be performed or may become difficult. For this reason, the content of the monomer unit having an epoxy group may be 25% by mass or less or 20% by mass or less based on the mass of the polyolefin-based copolymer.

The monomer unit having an epoxy group may be a monomer unit derived from an unsaturated carboxylic acid glycidyl ester or a monomer unit derived from a glycidyl ether having an unsaturated group, for example.

The unsaturated carboxylic acid glycidyl ester may be a compound represented by the following formula (1). In the formula (1), $R^5$ represents an alkenyl group having 2 to 18 carbon atoms and optionally having one or more substituents. Examples of the compound represented by the formula (1) include glycidyl acrylate, glycidyl methacrylate, and itaconic acid glycidyl ester.

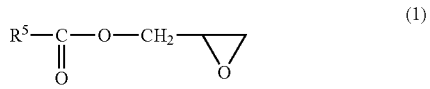

(1)

The glycidyl ether having an unsaturated group may be a compound represented by the following formula (2). In the formula (2), $R^6$ represents an alkenyl group having 2 to 18 carbon atoms and optionally having one or more substituents, and X represents $CH_2$—O or an oxygen atom. Examples of the compound represented by the formula (2) include allyl glycidyl ether, 2-methylallyl glycidyl ether, and styrene-p-glycidyl ether.

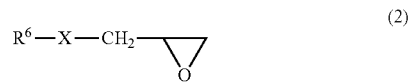

(2)

The polyolefin-based copolymer may be a two-component copolymer composed of ethylene and a monomer having an epoxy group, or may be a three- or more component copolymer further containing monomer(s) other than these monomers. It should be noted that the content of the monomer unit derived from the monomer other than ethylene and the monomer having an epoxy group is typically 35% by mass or less based on the mass of the polyolefin-based copolymer. The polyolefin-based copolymer may be a random copolymer or may be a block copolymer.

The melt flow rate of the polyolefin-based copolymer may be 300 g/10 min or less. A melt flow rate of 300 g/10 min or less means that the polyolefin-based copolymer has a large molecular weight to some extent. If the polyolefin-based copolymer has a large molecular weight, the heat resistance of the asphalt composition is further improved. From the same viewpoint, the melt flow rate of the polyolefin-based copolymer may be 200 g/10 min or less, 100 g/10 min or less, or 50 g/10 min or less. From the viewpoint that having a viscosity equal to that of the asphalt during melt kneading improves the dispersion efficiency, the melt flow rate of the polyolefin-based copolymer may be 3 g/10 min or more or 5 g/10 min or more. The melt flow rate of the polyolefin-based copolymer here is a value measured by a method A (a method of calculating the extrusion rate in terms of grams in unit per 10 minutes (g/10 min) from the weight of an extruded product generated in a predetermined time) under the condition at 90° C. and a load of 2.16 kg based on JIS 7210-1: 2014.

The content of the polyolefin-based copolymer in the raw material mixture for forming the asphalt composition may be 0.01 to 3% by mass based on the mass of the raw material mixture. Even with such a relatively small content, a sufficient modification effect by the modifier can be obtained. The content of the polyolefin-based copolymer may be 1.0% by mass or more from the viewpoint of heat resistance and toughness. From the economic viewpoint, the content of the polyolefin-based copolymer may be 2.5% by mass or less or 2.0% by mass or less.

The asphalt modifier according to an embodiment may further comprise another resin component, for example, a styrene butadiene styrene block copolymer (hereinafter, referred to as "SBS copolymer" in some cases). An asphalt composition exhibiting more excellent properties in heat resistance and stripping resistance can be obtained by a combination of the polyolefin-based copolymer with the styrene butadiene styrene block copolymer. In the case where a combination of the polyolefin-based copolymer and the SBS copolymer is used as a modifier, the polyolefin-based copolymer and the SBS copolymer each may be separately mixed with the asphalt, or a modifier containing the polyolefin-based copolymer and the SBS copolymer may be prepared in advance, and may be mixed with the asphalt.

The content of the SBS copolymer in the raw material mixture for forming the asphalt composition may be 0.5% by mass or more, 1.0% by mass or more, or 2.0% by mass or more based on the mass of the raw material mixture, and may be 10% by mass or less, 8% by mass or less, or 5% by mass or less thereof.

The asphalt composition according to an embodiment or the raw material mixture for forming the asphalt composition can further comprise another component other than the asphalt and the modifier, as needed, in the range without departing from the gist of the present invention. The total content of the asphalt and the asphalt modifier in the raw material mixture is typically 90 to 100% by mass or 95 to 100% by mass based on the mass of the raw material mixture.

The asphalt composition can be obtained by a method comprising a step of melt kneading the raw material mixture comprising the asphalt and the asphalt modifier. The melt kneading temperature may be a temperature at which the asphalt and the asphalt modifier melt, and is 100 to 250° C. or 160 to 200° C., for example. The melt kneading time is 1 to 6 hours, for example.

The asphalt mixture for road pavement according to an embodiment comprises the asphalt composition according to the embodiment above and an aggregate. The type and content of the aggregate can be appropriately adjusted in the range usually used in the road pavement field. Specifically, the content of the aggregate may be 1000 to 10000 parts by mass relative to 100 parts by mass based on the mass of the asphalt composition, for example. The asphalt mixture can comprise other components such as a filler, as needed.

EXAMPLES

Hereinafter, the present invention will be more specifically described by way of Examples. It should be noted that the present invention is not limited to these Examples.

1. Raw Materials
(1) Asphalt
Straight asphalt (hereinafter, referred to as "StAs" in some cases): StAs, made by JXTG Nippon Oil & Energy Corporation, penetration: 60 to 80°

(2) Modifier

Styrene-based thermoplastic elastomer (hereinafter, referred to as "SBS copolymer" or "SBS" in some cases): T437L and T432L (made by Asahi Kasei Corporation)

Ethylene/glycidyl methacrylate copolymer (hereinafter, referred to as "E/GMA copolymer" or "E/GMA" in some cases): Bond-fast E (hereinafter, referred to as "BF-E" in some cases), Bond-fast 20C (hereinafter, referred to as "BF-20C" in some cases), and Bond-fast CG5001 (hereinafter, referred to as "CG5001" in some cases) (made by Sumitomo Chemical Co., Ltd.)

Prototype A (an E/GMA copolymer prepared for the test, where the content of the monomer unit derived from glycidyl methacrylate is 18% by mass, and the melt flow rate is 32 g/10 min.)

Prototype B (an E/GMA copolymer prepared for the test, where the content of the monomer unit derived from glycidyl methacrylate is 20% by mass, and the melt flow rate is 7 g/10 min.)

2. Preparation of Asphalt Composition

Asphalt compositions in Examples or Comparative Examples were prepared from the raw material mixtures having the formations (% by mass) shown in Table 1 by the following procedure. First, StAs was left to stand in an oven at 160° C. for 2 hours. A predetermined amount of StAs having fluidity was placed into an aluminum can, and was cooled to room temperature. Subsequently, an SBS copolymer or an E/GMA copolymer as a modifier was placed onto the asphalt in the aluminum can.

An aluminum block thermostat (made by TAITEC CORPORATION, Dry Thermo Unit: DTU-2CN) was set at 180° C. After the temperature of the aluminum block reached the setting temperature, the aluminum can containing the asphalt and the modifier as the raw material mixture was placed thereinto to soften the raw material mixture by preparative heating for 30 to 40 minutes. A stirrer of a homomixer MARKII type 2.5 was inserted into the softened raw material mixture to stir the raw material mixture while the number of rotations of the stirrer gradually increased. After the number of rotations reached 7000 rpm, the stirring was continued while the number of rotations was kept. The stirrer was extracted at a time when the heating time including the preparative heating reached 4 hours, and the aluminum can was extracted from the aluminum block. The aluminum can was left to stand in an oven at 160° C. for 3 hours, thereby removing air bubbles from the asphalt composition formed in the aluminum can. Samples for evaluation tests were taken from the asphalt composition keeping fluidity.

3. Evaluations (1) Viscosity

The viscosity at 175° C. of the asphalt composition was measured by the following procedure according to the method of measuring the viscosity of liquid specified in JIS Z8803: 2011.

A sample of the asphalt composition was placed into a sample accommodating jig of a B type viscometer to which a spindle of type 27 was attached. While the asphalt composition was being heated to 175° C., the viscosity was measured under a condition of the spindle rotational speed of 50 rpm.

(2) Penetration

The penetration of each asphalt composition was measured by the test according to JIS K2207. A larger penetration means that the asphalt is softer.

(3) Softening Point

The softening point of the asphalt composition was measured by the test according to JIS K2207.

(4) Stripping Resistance

The stripping resistance of the asphalt composition was evaluated by the following test according to JPI-5S-27-86 "Method for stripping test for the asphalt coating film".

An aggregate having a particle size of 10 to 13 mm was prepared through classification of crushed stone #6 using 13 mm and 10 mm sieves. The aggregate was washed with water, and then was dried into a predetermined weight in a hot air dryer set at 150° C. The asphalt composition heated to a temperature which was lower than a temperature 80° C. higher than the softening point of the asphalt composition was applied to the dried aggregate to completely coat the surface of the aggregate with the asphalt composition. The proportion of the asphalt composition relative to 100 g of the aggregate was 5.5±0.2 g. The resulting asphalt coated sample was spread on a glass plate, and was immersed in 80° C. hot water (near the pH of 7), 80° C. acidic water (pH of 5), or 80° C. basic water (pH of 10) for one week. After the immersion, the proportion of the area where the asphalt composition was not stripped was measured. FIG. 1 is a photograph illustrating an example of the sample after immersed in 80° C. hot water (near the pH of 7). Stripping of the asphalt composition was much observed in Asphalt coated sample 20 in Comparative Example. In contrast, stripping of the asphalt composition was very few in Asphalt coated sample 10 in Example.

(5) Toughness 50 g of a sample of the asphalt composition was placed into a test cup of a test jig for toughness and tenacity. The position of the test cup containing the sample was adjusted such that the flat surface portion of the metal hemisphere of the tension head jig was located at the same height as that of the liquid level of the sample, and the metal hemisphere of the tension head jig was brought into contact with the sample. In this state, the sample was left to stand under an environment at 23° C. and a humidity of 50% overnight. Subsequently, using a tensile tester (made by SHIMADZU Corporation), the sample was pulled in the elongation direction by upwardly moving the tension head jig at a rate of 500 mm/min. The load until the sample was elongated to a displacement of 30 cm was measured to obtain a load-displacement curve. The lower area of the obtained load displacement curve, that is, the integration value (J) of load×displacement was recorded as the toughness of the asphalt composition.

TABLE 1

| | StAs Cont. | Modifier | | | | Viscosity/ 175° C. [cP] | Penetration [°] | Softening point [° C.] | Toughness [J] | Stripping resistance [%] | | |
|---|---|---|---|---|---|---|---|---|---|---|---|---|
| | | Type | GMA proportion | MFR | Cont. | | | | | pH7 | pH5 | pH10 |
| Comp. Ex. 1 | 100 | — | — | — | — | 80 | 74 | 50 | 8 | 31 | 20 | 47 |
| Comp. Ex. 2 | 96.0 | T437L SBS | — | 0 | 4.0 | 207 | 53 | 62 | 16 | 28 | 18 | 12 |

TABLE 1-continued

| | StAs Cont. | Modifier | | | | Viscosity/ 175° C. [cP] | Penetration [°] | Softening point [° C.] | Toughness [J] | Stripping resistance [%] | | |
|---|---|---|---|---|---|---|---|---|---|---|---|---|
| | | Type | GMA proportion | MFR | Cont. | | | | | pH7 | pH5 | pH10 |
| Comp. Ex. 3 | 96.0 | T432L | SBS | — | 0 | 4.0 | 234 | 49 | 63 | 26 | 30 | 17 | 17 |
| Comp. Ex. 4 | 92.0 | T432L | SBS | — | 0 | 8.0 | 668 | 45 | 94 | 53 | 57 | 42 | 68 |
| Comp. Ex. 5 | 98.5 | BF-E | E/GMA | 12 | 3 | 1.5 | 135 | 52 | 53 | 9 | 85 | — | — |
| Comp. Ex. 6 | 95.5 | BF-E | E/GMA | 12 | 3 | 0.5 | 244 | 52 | 58 | 18 | 81 | 91 | 98 |
| | | T437L | SBS | — | 0 | 4.0 | | | | | | | |
| Ex. 1 | 98.5 | CG5001 | E/GMA | 19 | 380 | 1.5 | 125 | 50 | 54 | 18 | 85 | — | — |
| Ex. 2 | 98.5 | Prototype A | E/GMA | 18 | 32 | 1.5 | 133 | 52 | 64 | 9 | 100 | 95 | 100 |
| Ex. 3 | 98.0 | Prototype A | E/GMA | 18 | 32 | 2.0 | 148 | 52 | 73 | 9 | 100 | 97 | 100 |
| Ex. 4 | 98.5 | BF-20C | E/GMA | 19 | 20 | 1.5 | 152 | 60 | 60 | 11 | 100 | 97 | 100 |
| Ex. 5 | 98.5 | Prototype B | E/GMA | 20 | 7 | 1.5 | 151 | 60 | 68 | 8 | 100 | 98 | 100 |
| Ex. 6 | 95.5 | Prototype A | E/GMA | 18 | 32 | 0.5 | 234 | 52 | 65 | 19 | 97 | 90 | 95 |
| | | T437L | SBS | — | 0 | 4.0 | | | | | | | |
| Ex. 7 | 95.5 | BF-20C | E/GMA | 19 | 20 | 0.5 | 248 | 51 | 67 | 25 | 98 | 92 | 98 |
| | | T437L | SBS | — | 0 | 4.0 | | | | | | | |
| Ex. 8 | 95.5 | Prototype B | E/GMA | 20 | 7 | 0.5 | 246 | 52 | 62 | 21 | 98 | 100 | 92 |
| | | T437L | SBS | — | 0 | 4.0 | | | | | | | |
| Ex. 9 | 95.5 | Prototype A | E/GMA | 18 | 32 | 0.5 | 289 | 54 | 60 | 32 | 95 | 90 | 98 |
| | | T432L | SBS | — | 0 | 4.0 | | | | | | | |
| Ex. 10 | 95.5 | BF-20C | E/GMA | 19 | 20 | 0.5 | 306 | 54 | 61 | 32 | 100 | 95 | 100 |
| | | T432L | SBS | — | 0 | 4.0 | | | | | | | |
| Ex. 11 | 95.5 | Prototype B | E/GMA | 20 | 7 | 0.5 | 313 | 53 | 65 | 31 | 100 | 95 | 100 |
| | | T432L | SBS | — | 0 | 4.0 | | | | | | | |

Table 1 shows the results of evaluation. In Table 1, the melt flow rate (MFR) of the copolymer and the content (GMA proportion) of the monomer unit derived from glycidyl methacrylate in the E/GMA copolymer are also shown. The asphalt compositions in Comparative Examples 2 to 4 using the SBS copolymer as the modifier had insufficient stripping resistance. The asphalt composition in Comparative Example 5, where the E/GMA copolymer containing less than 13% by mass of the monomer unit derived from glycidyl methacrylate (GMA) was used alone as the modifier, had a slightly low softening point, and did not always exhibit sufficient properties from comprehensive judgement including the stripping resistance and the toughness. The asphalt composition in Comparative Example 6, where the E/GMA copolymer containing less than 13% by mass of the monomer unit derived from GMA was used in combination with the SBS copolymer, exhibited low stripping resistance. The asphalt compositions in Examples using the modifiers containing the E/GMA copolymers containing 13% by mass or more of the monomer unit derived from GMA exhibited a relatively high softening point and exhibited excellent properties in stripping resistance and toughness. Furthermore, the asphalt compositions in Examples 2 to 11, where the MFR of the E/GMA copolymer was 300 or less, exhibited a high softening point of 56° C. or more, and exhibited excellent properties in heat resistance in particular.

REFERENCE SIGNS LIST

10: asphalt coated sample of Example, 20: asphalt coated sample of Comparative Example.

The invention claimed is:

1. An asphalt composition, the asphalt composition being a melt kneaded product of a raw material mixture comprising:
    an asphalt modifier; and
    an asphalt,
    wherein the asphalt modifier comprises a polyolefin-based copolymer, the polyolefin-based copolymer is a two-component copolymer composed of ethylene and a monomer having an epoxy group, and a content of the monomer unit having an epoxy group is 13% by mass or more based on a mass of the polyolefin-based copolymer,
    wherein a content of the polyolefin-based copolymer in the raw material mixture is 0.01% to less than 0.3% by mass based on a mass of the raw material mixture, and
    wherein a melt flow rate of the polyolefin-based copolymer is 50 g/10 min or less.

2. An asphalt mixture for road pavement comprising the asphalt composition according to claim 1, and an aggregate.

3. The asphalt composition according to claim 1, wherein the asphalt modifier further comprises a styrene butadiene styrene block copolymer.

4. The asphalt composition according to claim 1, wherein the content of the polyolefin-based copolymer in the raw material mixture is 0.01% to 0.25% by mass based on the mass of the raw material mixture.

* * * * *